(12) United States Patent
Mishina et al.

(10) Patent No.: US 6,533,853 B1
(45) Date of Patent: Mar. 18, 2003

(54) INK, AQUEOUS INK FOR INK-JET RECORDING, INK SET, INK CARTRIDGE, RECORDING UNIT, IMAGE-RECORDING APPARATUS, COLOR-IMAGE-RECORDING APPARATUS, INK-JET RECORDING PROCESS AND BLEEDING REDUCING METHOD

(75) Inventors: Shinya Mishina, Kawasaki (JP); Koichi Osumi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 140 days.

(21) Appl. No.: 09/661,393

(22) Filed: Sep. 13, 2000

(30) Foreign Application Priority Data

Sep. 17, 1999 (JP) .......................................... 11-264463

(51) Int. Cl.$^7$ .............................................. C09D 11/02
(52) U.S. Cl. .................. 106/31.6; 106/31.75; 106/31.86
(58) Field of Search ........................... 106/31.6, 31.75, 106/31.86

(56) References Cited

U.S. PATENT DOCUMENTS 5,846,307 A * 12/1998 Nagasawa et al. ........ 106/31.65
5,851,274 A * 12/1998 Lin .......................... 106/31.43
5,958,121 A *  9/1999 Lin .......................... 106/31.43
5,976,233 A   11/1999 Osumi et al. ............. 106/31.86
6,019,828 A *  2/2000 Rehman ................... 106/31.58
6,280,513 B1 * 8/2001 Osumi et al. .............. 106/31.6

FOREIGN PATENT DOCUMENTS

JP     63-152681      6/1988
JP       64-6074      1/1989

* cited by examiner

Primary Examiner—Helene Klemanski
Assistant Examiner—Veronica F. Faison
(74) Attorney, Agent, or Firm—Fitzpatrick, Cella, Harper & Scinto

(57) ABSTRACT

The present invention provides a pigment ink having carbon black having a dispersant and an ink which can provide high-grade images having a superior rub resistance without the loss of the inherent advantages of the pigment ink and can keep bleeding from occurring when color images are formed.

The ink is an ink comprising at least one salt selected from $(M_1)_2SO_4$, $CH_3COO(M_1)$, $Ph-COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group, and a carbon black having a dispersant.

20 Claims, 5 Drawing Sheets

MOVING DIRECTION OF CARRIAGE

INK, AQUEOUS INK FOR INK-JET RECORDING, INK SET, INK CARTRIDGE, RECORDING UNIT, IMAGE-RECORDING APPARATUS, COLOR-IMAGE-RECORDING APPARATUS, INK-JET RECORDING PROCESS AND BLEEDING REDUCING METHOD

BACKGROUND OF THE INVENTION

1. Field of the Invention

This invention relates to an ink, an ink set, an ink cartridge, a recording unit, an image-recording apparatus, a color-image-recording apparatus and an ink-jet recording process.

2. Related Background Art

As black inks for writing implements (such as fountain pens, felt-tip pens and aqueous ball-point pens) and black inks for ink-jet recording, inks making use of carbon black, which is a black colorant providing prints with a high density and also having a superior fastness and so forth have been proposed.

In recent years, detailed research and development have also been made on various aspects of the composition, physical properties and so forth of inks so that good recording can be performed, especially on plain paper such as copy paper, report paper, notebook paper, bond paper and continuous business forms. For example, Japanese Patent Applications Laid-open No. 63-152681 and No. 64-6074 disclose an aqueous pigment ink containing carbon black and a dispersant. Use of such an ink makes it possible to obtain images having a sharp character quality and having a high density.

The present inventors conducted a variety of studies concerning instances where black pigment inks containing, as a black pigment, carbon black containing a dispersant are used in ink-jet recording. As a result, they have found that inks having such constitution can not necessarily provide images with sufficient resistance to rubbing (rub resistance) for some types of recording mediums (e.g., plain paper) and may damage image quality. As a method for improving image rub resistance, the idea of adding a surface-active agent to an ink is proposed to improve the penetration of ink into recording mediums. When, however, the pigment ink is so made up as to be more readily penetrable into recording mediums, there is a problem of damaging character quality characteristics such as image sharpness and high density, which are the inherent advantages of pigment inks.

SUMMARY OF THE INVENTION

Accordingly, an object of the present invention is to provide an ink that is a pigment ink having carbon black and a dispersant for carbon black and that can realize high-grade images having superior rub resistance without the loss of such advantages inherent in pigment inks that the sharpness and high density of images formed can be attained, and also to provide an ink set, an ink cartridge, a recording unit, an image-recording apparatus, a color-image-recording apparatus and an ink-jet recording process which make use of such an ink.

Another object of the present invention is to provide an ink that is a pigment ink containing a dispersant-containing carbon black as a black pigment, and is less subject to any influence due to the type of recording medium, can realize a superior image quality, can effectively prevent bleeding when color images are formed and can stably form high-grade images, and also to provide an ink set, an ink cartridge, a recording unit, an image-recording apparatus, a color-image-recording apparatus and an ink-jet recording process that make use of such an ink.

The above objects can be achieved by the invention described below.

One aspect of according to the present invention, there is provided an ink comprising;

at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black;

a dispersant for the carbon black; and a medium.

According to another aspect of the present invention, there is provided an ink for ink-jet recording, comprising: a carbon black, a dispersant for the carbon black, and an aqueous medium, and further comprising as a bleeding preventive agent at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group; the ink reducing bleeding of the ink and an aqueous color ink at their boundary area when the ink and the color ink are so applied to a recording medium as to be adjacent to each other, and an ink having the same composition as the above except for not containing the salt causing bleeding when applied to plain paper by ink-jet recording adjacent to an aqueous different-color ink, at their boundary region.

In such an ink, when used as an ink for ink-jet recording, the solid component and liquid component in the ink separates very quickly after they have adhered to a recording medium; hence images can be kept from blurring. This is also very effective for improving image density and image rub resistance and also for keeping the bleeding from occurring. Thus, this ink is preferable as an ink for forming high-quality images by ink-jet recording.

According to a further aspect of the present invention, there is provided an ink set comprising, e.g., a combination of a black ink with an aqueous color ink containing at least one of coloring materials selected from cyan, magenta, yellow, red, green and blue coloring materials; the black ink comprising:

at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black;

a dispersant for the carbon black; and a medium.

According to a further aspect of the present invention, there is provided an ink cartridge comprising an ink holder which holds therein an ink comprising:

at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black;

a dispersant for the carbon black; and a medium.

According to a further aspect of the present invention, there is provided a recording unit comprising, e.g., an ink holder in which an ink for ink-jet recording is held and a head assembly for ejecting the ink; the ink comprising:

at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black;

a dispersant for the carbon black; and a medium.

According to a further aspect of the present invention, there is provided an image-recording apparatus comprising an ink cartridge comprising an ink holder which holds therein an ink for ink jet recording, a recording head for ejecting the ink held in the ink cartridge, and a means for feeding the ink from the ink cartridge, the ink comprising at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black;

a dispersant for the carbon black; and a medium.

According to a further aspect of the present invention, there is provided a color-image-recording apparatus comprising the recording unit described above, and a recording unit having an ink holder which holds therein an aqueous color ink containing at least one of a coloring material selected from cyan, magenta, yellow, red, green and blue coloring materials, and a recording head for ejecting the color ink held in the ink holder.

According to a further aspect of the present invention, there is provided a color-image-recording apparatus comprising an ink cartridge comprising an ink holder which holds therein an ink for ink jet recording comprising:

at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black;

a dispersant for the carbon black; and a medium, an ink cartridge having an ink holder which holds therein an aqueous color ink containing at least one of coloring materials selected from cyan, magenta, yellow, red, green and blue coloring materials, a recording head for ejecting the respective inks held in the respective ink holders, and means for feeding the respective inks from the respective ink cartridges to the recording head.

According to a further aspect of the present invention, there is provided an ink-jet recording process comprising ejecting an ink for ink-jet recording on the surface of a recording medium and adhering the ink to the recording medium; the ink comprising:

at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black;

a dispersant for the carbon black; and a medium.

According to a still further aspect of the present invention, there is provided a process for reducing bleeding of an aqueous black ink and a water-soluble color ink at their boundary region when the aqueous black ink and the water-soluble color ink are so applied to a recording medium as to be in side-by-side contact with each other; the aqueous black ink being an ink comprising:

at least one salt selected from $(M_1)_2SO_4$, $CH_3COO(M_1)$, Ph—$COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black; and a dispersant for the carbon black; which are contained in an aqueous medium.

DESCRIPTION OF THE PREFERRED EMBODIMENTS

Figure 1:
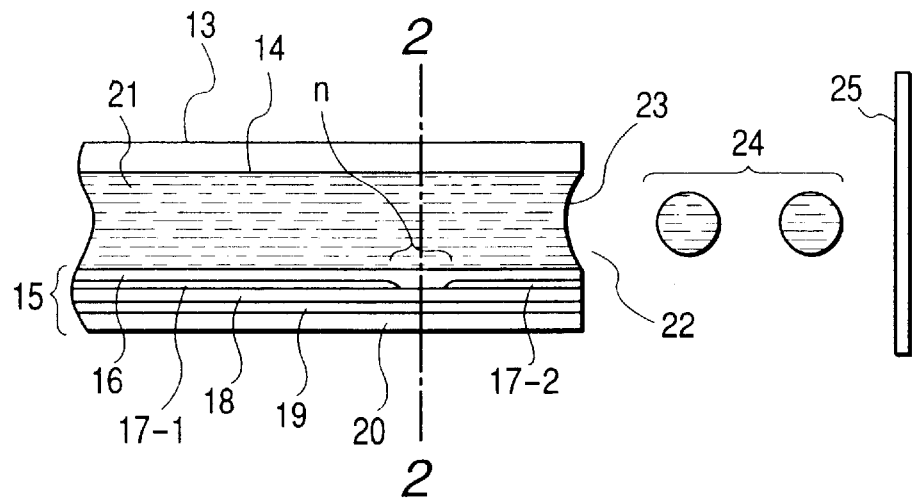
FIG. 1 is a vertical cross-sectional view showing an embodiment of a head assembly of an ink-jet recording apparatus.

The present invention will be described below in detail by giving preferred embodiments.

The ink of the present invention has one of its characteristic features in that an ink containing as a colorant a carbon black having a dispersant further contains a specific salt. These components are usually dispersed or dissolved in an aqueous medium to make up the ink of the present invention.

Salt:

The salt used in the ink of the present invention will be detailed first. The salt used in the present invention is at least one selected from $(M_1)_2SO_4$, $CH_3COO(M_1)$, Ph—COO$(M_1)$, $(M_1)NO_3$, $(M_1)Cl$, $(M_1)Br$, $(M_1)I$, $(M_1)_2SO_3$ and $(M_1)_2CO_3$. Here, $M_1$ represents an alkali metal, ammonium or an organic ammonium, and Ph represents a phenyl group. The alkali metal may include, e.g., Li, Na, K, Rb and Cs. The organic ammonium may include, e.g., methylammonium, dimethylammonium, trimethylammonium, ethylammonium, diethylammonium, triethylammonium, trihydroxymethylamine, dihydroxymethylamine, monohydroxymethylamine, monoethanolammonium, diethanolammonium and triethanolammonium. These ammoniums are derived respectively from corresponding organic amines.

The salt as described above is incorporated in the ink containing a carbon black having a dispersant. This makes it possible to provide, e.g., an ink improved in image rub resistance while maintaining image quality without damaging character sharpness or lowering image density. The reason why the ink of the present invention can bring about such effects is unclear. It is presumed to be attributable to the fact that, when, e.g., the above ink is ejected on, and adheres to, the recording medium surface such as a paper surface by ink-jet recording and after the ink has adhered to the paper surface, solid-liquid separation of the ink takes place immediately. More specifically, the immediate solid-liquid separation of the ink makes the dispersant penetrate only slightly into the paper. As a result, the dispersant remains in a larger quantity in the vicinity of the paper surface than in its interior. Thus, it is presumed that this dispersant functions as a kind of pigment binder to bring about an improvement in rub resistance of the carbon black. Moreover, since the pigment does not penetrate deeply into the paper because of the solid-liquid separation, image sharpness and high image density as character quality, which are advantages inherent in pigments, are by no means damaged.

The ink of the present invention constituted as described above may be used as an ink set in combination with at least one aqueous color ink containing at least one coloring material selected from cyan, magenta, yellow, red, green and blue coloring materials. When the ink set is used to form color images, it exhits an additional effect such that any bleeding can effectively be kept from occurring at the boundary region between the image formed by the ink of the present invention which contains carbon black and the image formed by the other color ink(s).

The above various meritorious effects can be best achieved when the salt is contained in an amount of preferably from 0.05 to 10% by weight, and more preferably from 0.1 to 5% by weight, based on the total weight of the ink. Also, among the above salts, $(M_1)_2SO_4$ (e.g., potassium sulfate) and $C_6H_5COONH_4$ (ammonium benzoate) have a good compatibility with carbon black, and provide the ink with an especially good solid-liquid separation effect.

As for the content of the carbon black having a dispersant in the ink, as will be detailed later, it may preferably be set within the range of from 0.1 to 15% by weight, and particularly from 1 to 10% by weight, based on the total weight of the ink.

Carbon black:

The carbon black used in the present invention will be described below. The carbon black used in the ink of the present invention may include, but is not limited to, e.g., carbon black pigments such as furnace black, lamp black, acetylene black and channel black, and specifically, e.g., Raven 7000, Raven 5750, Raven 5250, Raven 5000, Raven 3500, Raven 2000, Raven 1500, Raven 1250, Raven 1200, Raven 1190 ULTRA-11, Raven 1170, and Raven 1255 (trade names; all available from Columbian Carbon Limited.); Black Pearls L, Regal 400R, Regal 330R, Regal 660R, Mogul L, Monarch 700, Monarch 800, Monarch 880, Monarch 900, Monarch 1000, Monarch 1100, Monarch 1300, Monarch 1400, and Valcan XC-72R (trade names; all available from Cabot Corp.); Color Black FW1, Color Black FW2, Color Black FW2V, Color Black FW18, Color Black FW200, Color Black S150, Color Black S160, Color Black S170, Printex 35, Printex U, Printex V, Printex 140U, Printex 140V, Special Black 6, Special Black 5, Special Black 4A, and Special Black 4 (trade names; all available from Degussa Corp.); and No.25, No.33, No.40, No.47, No.52, No.900, No.2300, MCF-88, MA600, MA7, MA8, and MA100 (trade names; all available from Mitsubishi Chemical Industries Limited). Magnetic fine particles such as magnetite and ferrite particles, or titanium black or the like may also be used.

Dispersant:

The dispersant for dispersing the above carbon black used in the ink of the present invention will be described below. The dispersant may include sulfonic acid type dispersants and carboxylic acid type dispersants. The sulfonic acid type dispersants may include, e.g., polymer type dispersants such as polystyrenesulfonic acid and salts thereof, a styrene-styrenesulfonic acid copolymer and salts thereof, a vinyl compound-vinylsulfonic acid copolymer and salts thereof; and surface-active agent type dispersants such as dodecylbenzenesulfonic acid and salts thereof, chelilbenzenesulfonic acid and salts thereof, isopropylnaphthalenesulfonic acid and salts thereof, monobutylphenylphenolmonosulfonic acid and salts thereof, monobutylbiphenylsulfonic acid and salts thereof, dibutylphenylphenoldisulfonic acid and salts thereof, and condensates of naphthalenesulfonic acid with formalin and salts thereof.

The carboxylic acid type dispersants may include polymer type dispersants comprised of copolymers of hydrophilic monomers with hydrophobic monomers, or salts thereof. The hydrophilic monomers may include, e.g., $\alpha,\alpha$-ethylenically unsaturated carboxylic acid, $\alpha,\alpha$-ethylenically unsaturated carboxylic acid derivatives, acrylic acid, acrylic acid derivatives, methacrylic acid, methacrylic acid derivatives, maleic acid, maleic acid derivatives, itaconic acid, itaconic acid derivatives, fumaric acid, and fumaric acid derivatives. Also, the hydrophobic monomers may include, e.g., styrene, styrene derivatives, vinyltoluene, vinyltoluene derivatives, vinylnaphthalene, vinylnaphthalene derivatives, butadiene, butadiene derivatives, isoprene, isoprene derivatives, ethylene, ethylene derivatives, propylene, propylene derivatives, alkyl esters of acrylic acid, and alkyl esters of methacrylic acid.

The salts of these copolymers of hydrophilic monomers with hydrophobic monomers may include, but are not limited to, e.g., alkali metal salts; and onium salts such as ammonium salts, organic ammonium salts, phosphonium salts, sulfonium salts, oxonium salts, stibonium salts, stannonium salts and iodonium salts. The above copolymers and salts thereof may also have a polyoxyethylene group, a hydroxyl group or the like introduced thereinto, or may appropriately be copolymerized with acrylamide, an acrylamide derivative, dimethylaminoethyl methacrylate, ethoxyethyl methacrylate, butoxyethyl methacrylate, ethoxytriethylene methacrylate, methoxypolyethylene glycol methacrylate, vinylpyrrolidone, vinylpyridine, vinyl alcohol or an alkyl ether.

Those used as the above sulfonic acid type dispersants and carboxylic acid type dispersants may also be surface-active agent type dispersants which are not polymers, but may preferably be polymer type dispersants. When such polymers are copolymers, they may have the structure of random, block or graft copolymers. Also, any of the dispersants may have a low-molecular weight but, in view of dispersion stability of organic pigments, may preferably have a weight-average molecular weight ranging from 1,000 to 100,000, more preferably from 2,000 to 80,000, and most preferably from 2,500 to 70,000. Of course, the surface-active agent type dispersants as described above may be used as dispersants, but in such a case, the penetrability into recording mediums becomes high. The dispersant may preferably be contained in the ink in an amount of from 10 to 100% by weight, and particularly preferably from 20 to 60% by weight, based on the weight of the pigment in the ink.

Medium:

The medium of the ink of the present invention will be described below. The ink of the present invention has the carbon black having the salt and the dispersant as described above. These are usually dissolved or dispersed in an aqueous medium. The aqueous medium may include, e.g., water. Mixed solvents of water and water-soluble organic solvents, and mixed solvents of water and water-soluble organic solvents may preferably be used. As the water-soluble organic solvents, those having an ink-drying preventive effect are particularly preferred.

The water-soluble organic solvents may include, e.g., alkyl alcohols having 1 to 4 carbon atoms such as methyl alcohol, ethyl alcohol, n-propyl alcohol, isopropyl alcohol, n-butyl alcohol, sec-butyl alcohol and tert-butyl alcohol; amides such as dimethylformamide and dimethylacetamide; ketones or ketoalcohols such as acetone, methyl ethyl ketone, methyl isobutyl ketone and diacetone alcohol; ethers such as tetrahydrofuran and dioxane; polyalkylene glycols such as polyethylene glycol and polypropylene glycol; polyols whose alkylene groups have 2 to 6 carbon atoms, such as ethylene glycol, propylene glycol, butylene glycol, triethylene glycol, 1,2,6-hexanetriol, thiodiglycol, hexylene glycol and diethylene glycol; lower alkyl ether acetates such as polyethylene glycol monomethyl ether acetate; lower alkyl ethers of polyhydric alcohols, such as ethylene glycol monomethyl(or ethyl) ether, diethylene glycol methyl(or ethyl) ether and triethylene glycol monomethyl(or ethyl) ether; polyhydric alcohols such as trimethylolpropane and trimethylolethane; and N-methyl-2-pyrrolidone, 2-pyrrolidone, and 1,3-dimethyl-2-imidazolidinone. Any of the above water-soluble organic solvents may be used alone or in the form of a mixture. Also, as the water, deionized water may preferably be used.

There are no particular limitations on the quantity of the water-soluble organic solvent contained in the ink of the present invention. It may preferably be in an amount ranging from 3 to 50% by weight based on the total weight of the ink. Also, the water contained in the ink may preferably be in an amount ranging from 50 to 95% by weight based on the total weight of the ink.

Production of ink:

The ink of the present invention may be prepared, e.g., in the following way: The carbon black is added in a stated quantity to an aqueous medium containing the sulfonic acid type or carboxylic acid type dispersant in a stated quantity, and the mixture obtained is stirred thoroughly and thereafter dispersed by means of a dispersion machine. From the dispersion obtained, coarse particles are removed by centrifugation or the like, and thereafter the salt in the present invention as described above and the stated solvent, additives and so forth are added and mixed with stirring followed by filtration. As the dispersion machine used here, any of those commercially available may be used. For example, colloid mills, flow jet mills, slasher mills, high-speed dispersers, ball mills, attritors, sand mills (such as Sand Grinder, Ultrafine Mill, Eiger Motor Mill, Daino Mill, Pearl Mill, Agitator Mill and Koboru Mill, all trade names), three-roll mills, twin-roll mills, extruders, kneaders, ultimizers, microfluidizers, laboratory homogenizers and ultrasonic homogenizers are available. Any of these may be used alone or in combination. Also, after the stated solvent has been mixed, and after the sulfonic acid type or carboxylic acid type dispersant has been added in the stated quantity, the organic pigment may be added, followed by dispersion by means of the dispersion machine.

The ink of the present invention can be used as ink for writing implements and ink for ink-jet recording. When used as the ink for ink-jet recording, a recording process in which mechanical energy is made to act on ink to eject ink droplets and a recording process in which heat energy is applied to ink to cause the ink to bubble to eject ink droplets are available as ink-jet recording processes. The ink of the present invention can preferably be applied to either of these recording processes.

Now, in the case where the ink of the present invention is used for the above ink-jet recording, the ink may preferably be an ink having properties such that it can be ejected from an ink-jet recording head. From the viewpoint of ejection performance from the ink-jet recording head, the ink may preferably have as its properties a viscosity of from 1 to 15 cPs and a surface tension of 25 dyn/cm or higher, and may more preferably be so prepared as to have a viscosity of from 1 to 5 cPs and a surface tension of from 25 to 50 dyn/cm. Also, as the composition of a preferable aqueous medium which enables the ink of the present invention to be endowed with the properties as described above, the aqueous medium may preferably be a mixed solvent of water and a water-soluble organic solvent, and the water-soluble organic solvent may preferably include glycerol, trimethylolpropane, thiodiglycol, ethylene glycol, diethylene glycol, isopropyl alcohol and acetylene alcohol.

As the acetylene alcohol, it is preferable to use, e.g., a compound having the following structure.

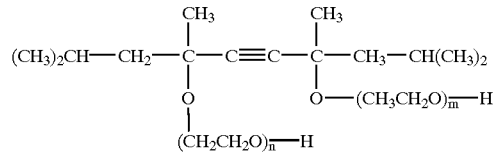

(wherein m+n=10)

To the ink of the present invention, in addition to the above components, a surface-active agent, an anti-foaming agent, an antiseptic, an antifungal agent, a pH adjuster, an antioxidant and so forth may further optionally be added in order to make up an ink having the desired physical properties. A commercially available water-soluble dye may still further be added for the purpose of color matching or the like.

Ink set:

The ink set of the present invention will be described below. The ink set of the present invention is characterized by comprising a combination of at least i) the black ink of the present invention constituted as described above and ii) at least one aqueous color ink containing at least one coloring material selected from cyan, magenta, yellow, red, green and blue coloring materials. More specifically, the ink set of the present invention comprises a combination of the black ink of the present invention with at least one color ink selected from a color ink containing a yellow coloring material, a color ink containing a magenta coloring material, a color ink containing a cyan coloring material, a color ink containing a red coloring material, a color ink containing a blue coloring material and a color ink containing a green coloring material, making up an ink set preferably used for the formation of color images. Then, where such an ink set is used to perform recording in such a way that a black image area adjoins a color image area, any bleeding can effectively be kept from occurring at the boundary region between the image formed by using the ink of the present invention which contains carbon black and the image formed by using the other color ink(s).

The reason why such an ink set can effectively keep the bleeding from occurring is unclear, but it is presumed to be related to the solid-liquid separation rate of the ink of the present invention at the surface of the recording medium. The presumption is that, as an effect realized by incorporating the salt in the carbon black having a dispersant in the black ink of the present invention, the solid-liquid separation after adhesion of the black ink to the recording medium and the subsequent solidification of the colorant take place immediately, so that the black ink can exude only slightly to the color ink side at the boundary between the black image and the color image.

As the colorant(s) used when the color ink(s) which constitute(s) the ink set in combination with the ink of the present invention is/are prepared, known dyes as listed below may be used. The content of the colorant added in each color ink may appropriately be so selected that, e.g., when used in ink-jet recording, the ink can have good ink-jet ejection performance and can have the desired color tone and density. As a standard, the colorant may be in a content ranging from 0.1 to 15% by weight, and particularly from 1 to 10% by weight, based on the total weight of the ink.

As the dye(s) added in the color ink(s), anionic dyes as exemplified by acid dyes, reactive dyes, direct dyes and food dyes may be used. These anionic dyes may be either those conventionally available or those synthesized anew. Most dyes are usable as long as images having suitable color tone and density are obtainable when images are formed. Also, any of these may be used in the form of a mixture.

Specific examples of the anionic dyes usable in the color inks are shown below according to color tones of the inks.

Yellow coloring materials:
C.I. Direct Yellow: 8, 11, 12, 27, 28, 33, 39, 44, 50, 58, 85, 86, 87, 88, 89, 98, 100, 110;
C.I. Acid Yellow: 1, 3, 7, 11, 17, 23, 25, 29, 36, 38, 40, 42, 44, 76, 98, 99;
C.I. Reactive Yellow: 2, 3, 17, 25, 37, 42; and
C.I. Food Yellow: 3.

Red coloring materials:
C.I. Direct Red: 2, 4, 9, 11, 20, 23, 24, 31, 39, 46, 62, 75, 79, 80, 83, 89, 95, 197, 201, 218, 220, 224, 225, 227, 228, 229, 230;
C.I. Acid Red: 6, 8, 9, 13, 14, 18, 26, 27, 32, 35, 42, 51, 52, 80, 83, 87, 89, 92, 106, 114, 115, 133, 134, 145, 158, 198, 249, 265, 289;
C.I. Reactive Red: 7, 12, 13, 15, 17, 20, 23, 24, 31, 42, 45, 46, 59; and
C.I. Food Red: 87, 92, 94.

Blue coloring materials:
C.I. Direct Blue: 1, 15, 22, 25, 41, 76, 77, 80, 86, 90, 98, 106, 108, 120, 158, 163, 168, 199, 226;
C.I. Acid Blue: 1, 7, 9, 15, 22, 23, 25, 29, 40, 43, 59, 62, 74, 78, 80, 90, 100, 102, 104, 117, 127, 138, 158, 161; and
C.I. Reactive Blue: 4, 5, 7, 13, 14, 15, 18, 19, 21, 26, 27, 29, 32, 38, 40, 44, 100.

Black coloring materials:
C.I. Direct Black: 17, 19, 22, 31, 32, 51, 62, 71, 74, 112, 113, 154, 168, 195;
C.I. Acid Black: 2, 48, 51, 52, 110, 115, 156; and
C.I. Food Black: 1, 2.

As for the solvent or dispersant used when the color inks are prepared, they may include, e.g., water, or mixed solvents of water and water-soluble organic solvents. As the water-soluble organic solvents, the same as those used in the ink of the present invention as described previously may be used. Also, when the color inks are made to adhere to a recording medium by ink-jet recording (e.g., bubble-jet recording), as in the case of the ink of the present invention, the color inks may preferably be so prepared that they have the above desired viscosity and surface tension so as to have a good ink-jet ejection performance. For example, when the mixed solvent is used, the water-soluble organic solvent may be in an amount ranging from 3 to 50% by weight based on the total weight of the ink. Also, the water contained in each color ink may preferably be in an amount ranging from 50 to 95% by weight based on the total weight of the ink.

Figure 2:
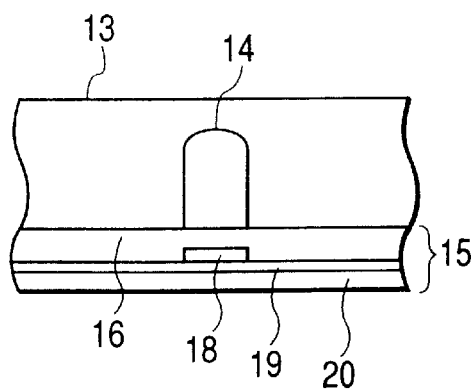
FIG. 2 is a cross-sectional view along the line 2—2 in FIG. 1.

Ink-jet recording apparatus/recording process:

An ink-jet recording technique in which the ink or ink set of the present invention is preferably used will be described below. FIGS. 1 and 2 show an example of the construction of a head which is the main constituent of an apparatus utilizing heat energy for the ejection of ink, as an ink-jet recording apparatus.

FIG. 1 is a cross-sectional view of a head 13 along an ink channel, and FIG. 2 is a cross-sectional view along the line A-B in FIG. 1. The head 13 is formed by bonding a glass, ceramic or plastic plate or the like provided with a channel (nozzle) 14 through which ink is passed, to a heating element substrate member 15. The heating element substrate member 15 is comprised of a protective layer 16 formed of silicon oxide, silicon nitride or silicon carbide, electrodes 17-1 and 17-2 formed of aluminum, gold, or aluminum-copper alloy, a heating resistor layer 18 formed of a high-melting material such as $HfB_2$, TaN or TaAl, a heat accumulating layer 19 formed of thermally oxidized silicon or aluminum oxide, and a substrate 20 formed of a material having good heat dissipation properties, such as silicon, aluminum or aluminum nitride.

Upon application of pulse-form electric signals to the electrodes 17-1 and 17-2 of the head 13, heat is abruptly generated at the region denoted by n in the heating resistor substrate member 15, so that bubbles are generated in the ink coming into contact with the surface of this region. The pressure thus produced thrusts out a meniscus 23 and the ink is ejected through the nozzle 14 from an ejection orifice 22 in the form of minute ink drops 24 on a recording medium 25.

Figure 3:
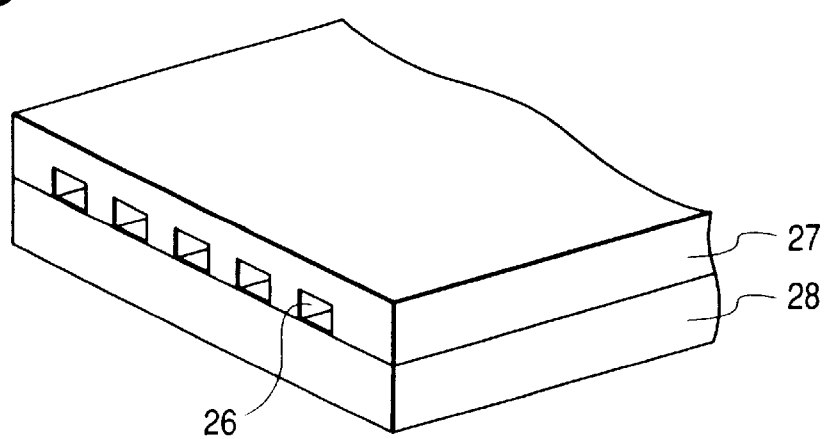
FIG. 3 is a schematic illustration of a multi-head assembly.

FIG. 3 schematically illustrates a multi-head in which the head as shown in FIG. 1 is arranged in a large number. This multi-head is prepared by bonding a glass plate 27 having a multi-nozzle 26, to a heating head 28 similar to the head as illustrated in FIG. 1.

Figure 4:
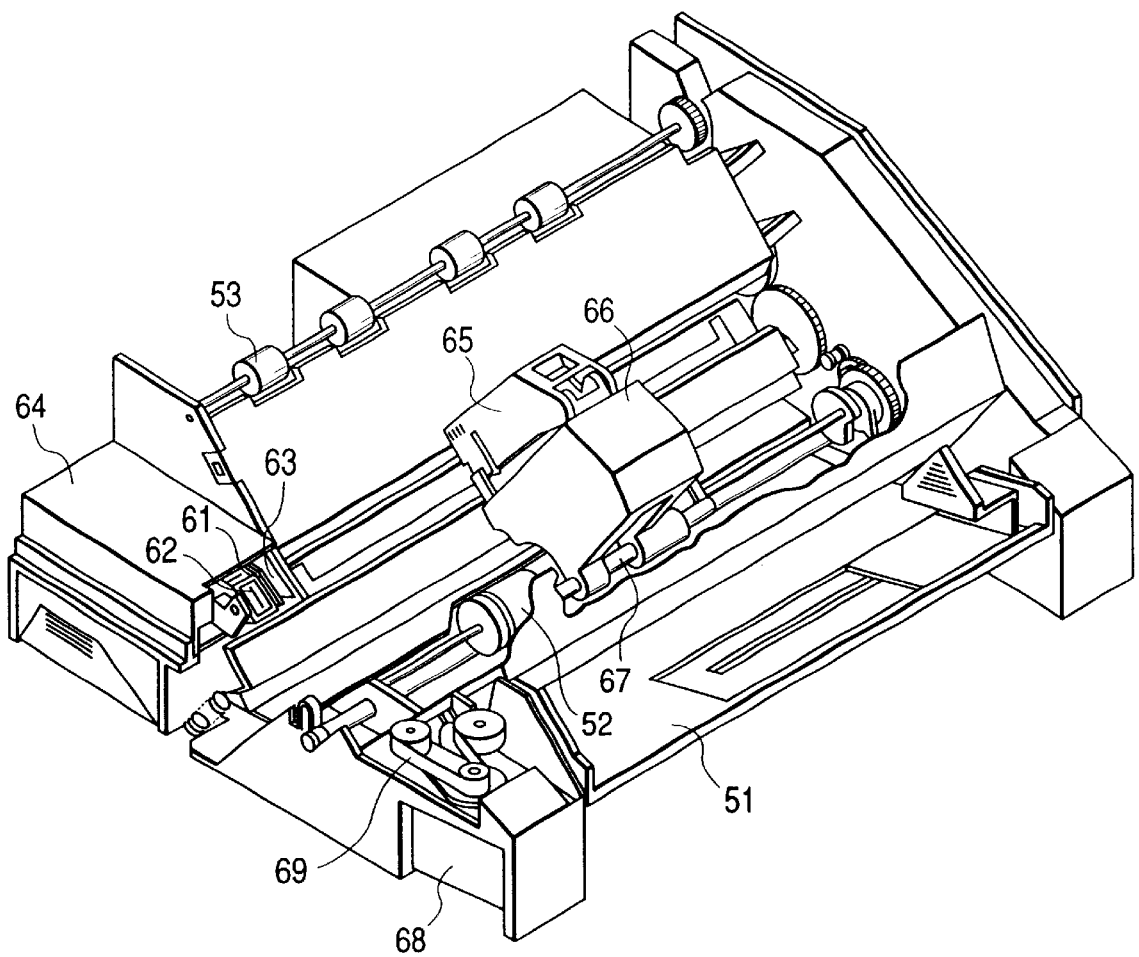
FIG. 4 is a schematic perspective view showing an embodiment of an ink-jet recording apparatus.

FIG. 4 shows an example of the ink-jet recording apparatus in which such a head 13 has been incorporated. In FIG. 4, reference numeral 61 denotes a blade serving as a wiping member, which is in the form of a cantilever one end of which is a stationary end retained by a blade-retaining member. The blade 61 is provided at the position adjacent to the region in which a recording head 65 makes a record. In the present example, the blade is retained in such a form that it projects into the course through which the recording head 65 is moved.

Reference numeral 62 denotes a cap for the face of ink ejection openings of the recording head 65, which is provided at the home position adjacent to the blade 61, and is so constructed that it moves in the direction perpendicular to the direction in which the recording head 65 is moved, and comes into contact with the face of ink ejection openings to carry out capping. Also, reference numeral 63 denotes an ink absorber provided adjacent to the blade 61, and, like the blade 61, is retained in such a form that it projects to the course through which the recording head 65 is moved. The above blade 61, cap 62 and absorber 63 constitute an ejection restoration assembly 64, where the blade 61 and the absorber 63 remove water, dust and so forth from the ink ejection opening face.

Reference numeral 65 denotes the recording head having an ejection energy generating means and ejects ink on the recording medium opposite to the ejection opening face provided with ejection openings, carrying out recording. Reference numeral 66 denotes a carriage on which the recording head 65 is mounted so that the recording head 65 can be moved. The carriage 66 is brought into sliding contact with a guide shaft 67. Part of the carriage 66 is connected (not shown) with a belt 69 driven by a motor 68. Thus, the carriage 66 can be moved along the guide 67 and hence the recording head 65 can be moved from a recording region to a region adjacent thereto. Reference numeral 51 denotes a feeding part from which recording mediums are inserted, and 52, a feed roller driven by a motor (not shown).

With such a construction, the recording medium is fed to the position opposite to the ejection opening face of the recording head 65, and, with progress of recording, outputted from an output section provided with an output roller 53.

In the above construction, the cap 62 of the ejection restoration assembly 64 recedes from the moving course of the recording head 65 when the recording head 65 returns to its home position after completion of recording, and the blade 61 projects into the moving course. As a result, the ejection opening face of the recording head 65 is wiped.

When the cap 62 comes into contact with the ejection opening face of the recording head 65 to carry out capping, the cap 62 is moved in such a way that it projects into the moving course of the recording head. When the recording head 65 is moved from its home position to the position at which recording is started, the cap 62 and the blade 61 are at the same position as the ejection opening face is wiped. As a result, the ejection opening face of the recording head 65 is wiped also at the time of this movement.

Not only is the recording head moved to its home position at the time of completing recording or restoring ejection, but also it is moved to the home position adjacent to each recording region at given intervals while it is moved between recording regions for the purpose of recording, where the ejection opening face is wiped in accordance with this movement.

Figure 5:
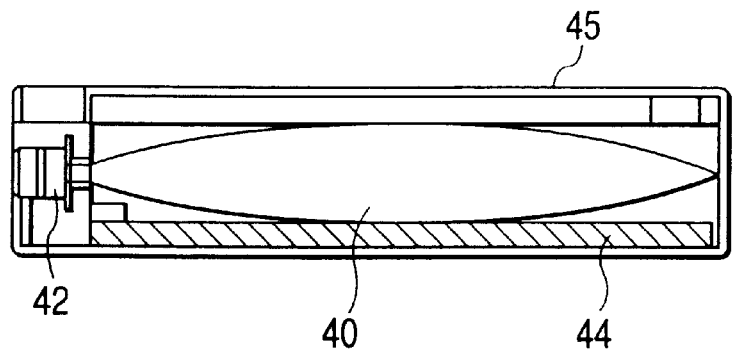
FIG. 5 is a vertical cross-sectional view showing an embodiment of an ink cartridge.

FIG. 5 shows an example of an ink cartridge, denoted as 45, that has held the ink being fed to the recording head through an ink-feeding member, e.g., a tube. Here, reference numeral 40 denotes an ink holder, e.g., an ink bag, that has held the feeding ink. The top thereof is provided with a stopper 42 made of rubber. A needle (not shown) may be inserted into this stopper 42 so that the ink in the ink holder 40 can be fed to the head. Reference numeral 44 denotes an absorber that receives a waste ink. It is preferable for the ink holder to be formed of a polyolefin, particularly polyethylene, at its face coming into contact with ink.

Figure 6:
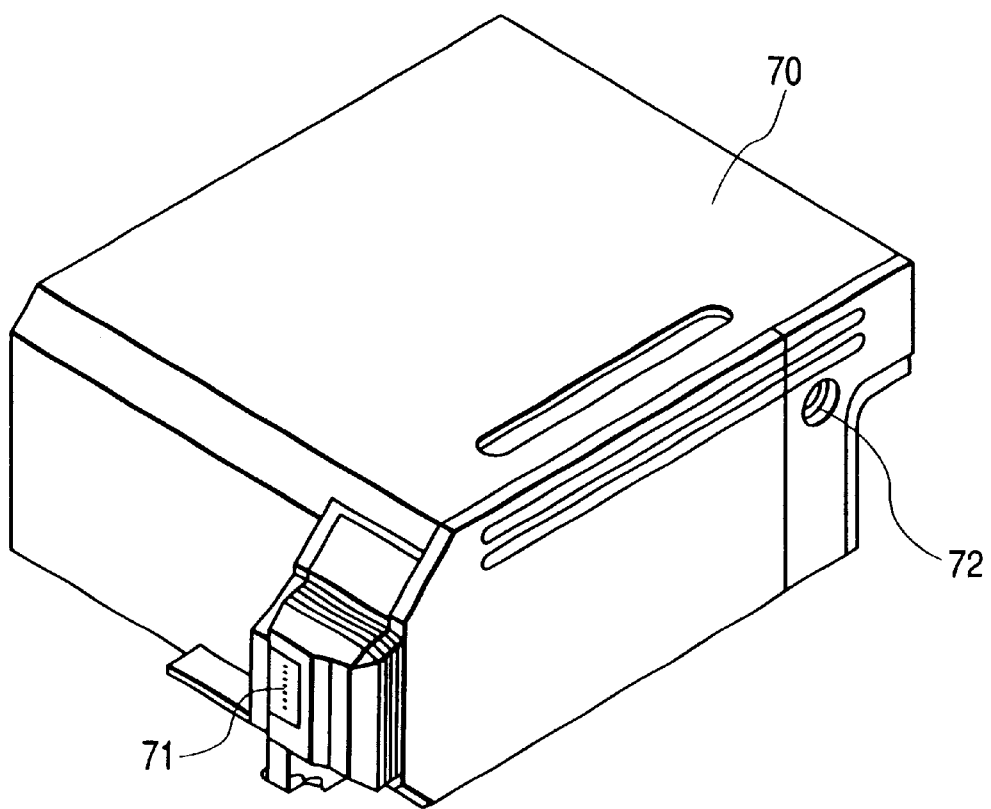
FIG. 6 is a perspective view showing an example of a recording unit.

The ink-jet recording apparatus in which the ink or ink set of the present invention is preferably usable is not limited to the apparatus as described above in which the head and the ink cartridge are separately provided. The ink or ink set of the present invention is preferably usable also in a device in which these are integrally formed as shown in FIG. 6. In FIG. 6, reference numeral 70 denotes a recording unit, in the interior of which an ink holder that has held an ink, e.g., an ink absorber, is contained. The recording unit is so constructed that the ink in such an ink absorber is ejected in the form of ink droplets from a head 71 having a plurality of orifices. As a material for the ink absorber, polyurethane may preferably be used.

In place of the ink absorber, the recording unit may be so constructed that the ink holder is an ink bag internally provided with a spring or the like. Reference numeral 72 denotes an air path opening through which the interior of the cartridge is made to communicate with the atmosphere. This recording unit 70 can be used in place of the recording head 65 shown in FIG. 4, and is detachably mountable on the carriage 66.

Next, with regard to the form of an ink-jet recording apparatus utilizing mechanical energy, an on-demand type ink-jet recording head is shown which is provided with a nozzle-formed substrate having a plurality of nozzles, a pressure generating device comprised of a piezoelectric material and a conductive material, provided opposite to the nozzles, and an ink with which the surroundings of the pressure generating device is filled, and in which the pressure generating device is made to undergo displacement by an applied voltage to eject minute ink drops from the nozzles. An example of the construction of the recording head, which is the main constituent of the apparatus, is shown in FIG. 7.

The recording head is constituted of an ink channel 80 communicating with an ink chamber (not shown), an orifice plate 81 for ejecting ink drops with the desired volume, a vibrating plate 82 that makes a pressure act directly on ink, a piezoelectric device 83 that is joined to this vibrating plate 82 and is made to undergo displacement by electric signals, and a substrate 84 for supporting and fixing the piezoelectric device 83, the orifice plate 81, the vibrating plate 82 and so forth.

Figure 7:
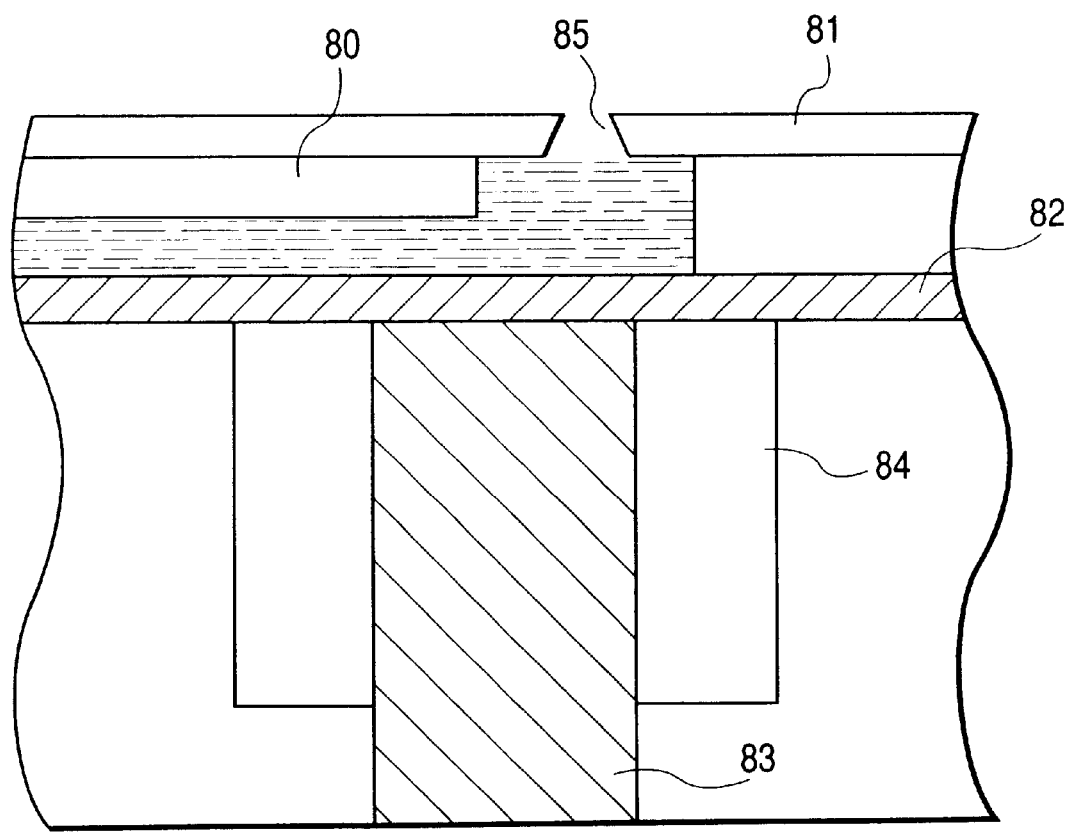
FIG. 7 is a schematic perspective view showing another example of the construction of an ink-jet recording head.

As shown in FIG. 7, the ink channel 80 is formed of a photosensitive resin or the like, and the orifice plate 81 is made of a metal such as stainless steel or nickel, and is provided with an ejection orifice 85 formed by making a hole by electroplating or pressing. The vibrating plate 82 is formed of a metal film of stainless steel, nickel, titanium or the like, or a highly resilient resin. The piezoelectric device 83 is formed of a dielectric material such as barium titanate or PZT (Pb—Zr—Ti).

The recording head constituted as described above operates as follows: a pulse-form voltage is applied to the piezoelectric device 83 to produce a strain stress, the energy thus produced strains the vibrating plate 82 jointed to the piezoelectric device 83, and the ink inside the ink channel 80 is vertically pressed, so that ink drops (not shown) are ejected from the ejection orifice 85 of the orifice plate 81 to make a record. In the use of such a recording head, it is incorporated into the same recording apparatus as shown in FIG. 4. Individual parts of the recording apparatus may operate in the same manner as previously described.

Figure 9:
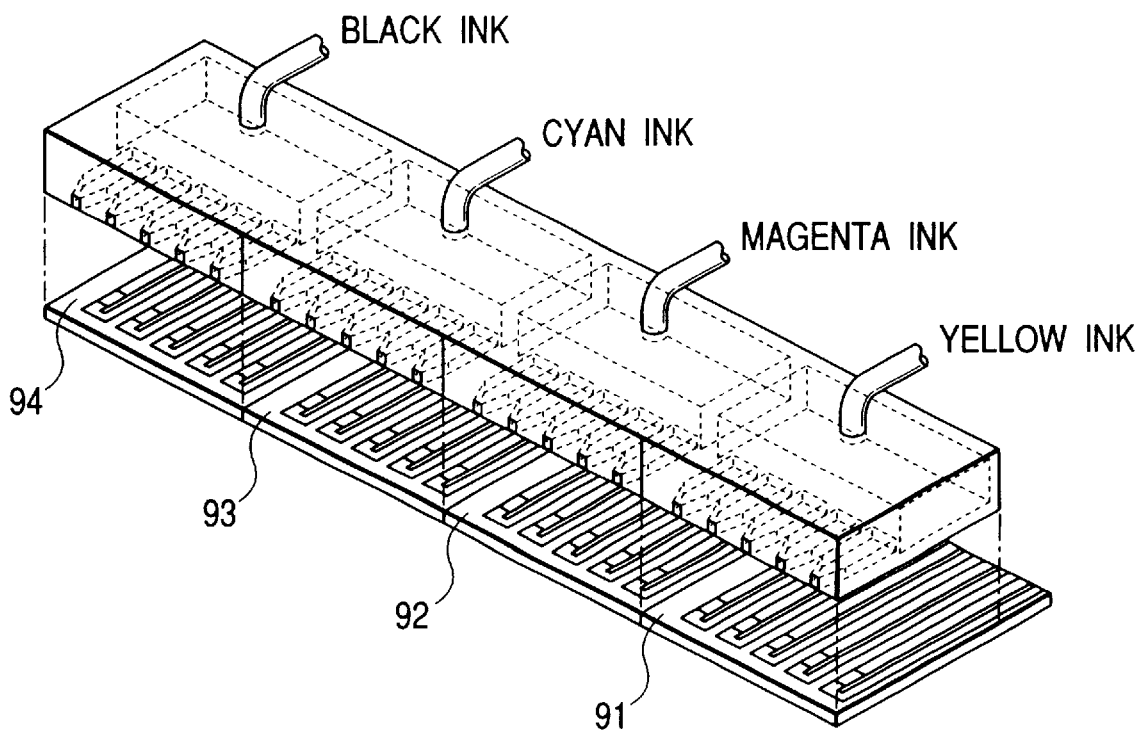
FIG. 9 is a schematic illustration of the construction in which four recording heads are arranged on a carriage.

When color images are formed using the ink set described above, a recording apparatus may preferably be used in which, e.g., four recording heads as previously shown in FIG. 3 are arranged on a carriage. FIG. 9 shows such an example and reference numerals 91, 92, 92 and 94 denote recording units for ejecting a yellow ink, a magenta ink, a cyan ink and a black ink, respectively. The respective units are provided on the carriage of the recording apparatus described above, and eject the inks of respective colors in accordance with recording signals.

Figure 8:
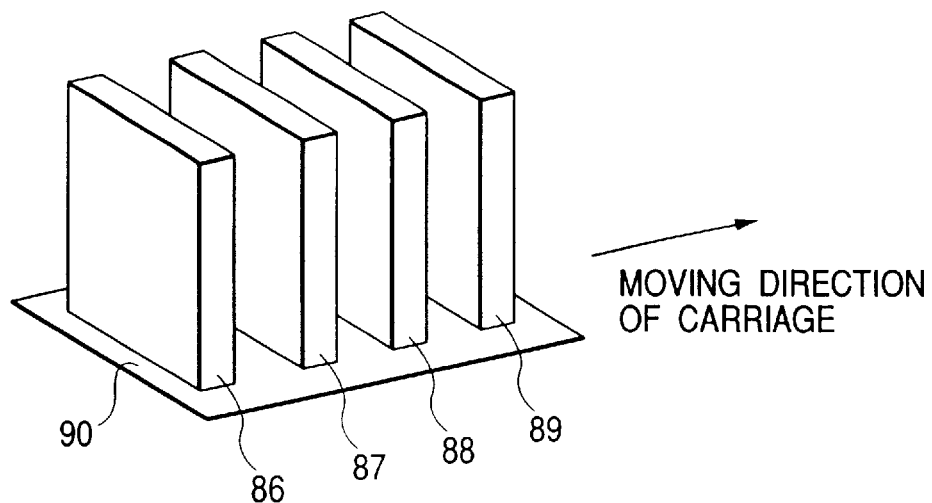
FIG. 8 is a schematic illustration of a recording head provided with four ink cartridges.

In FIG. 9, an example is shown in which the four recording units are used, but is by no means limited to it. For example, as shown in FIG. 8, recording may also be performed using one recording head 90 in which ink channels are so divided that respective color inks fed from ink cartridges 86 to 89 containing the respective four color inks can separately be ejected.

As described above, the present invention can realize the following meritorious effects.

(1) A pigment ink is obtained which can provide prints with a superior rub resistance and also does not damage the advantages inherent in the pigment ink.

(2) An ink set can be obtained which can effectively keep the bleeding from occurring when color images are formed.

(3) An image-forming apparatus, an image-forming method and an ink cartridge and a recording unit, used therein, can be obtained which can reduce any influence of recording mediums on image quality and can stably form high-grade images.

EXAMPLES

The present invention will be described below in greater detail by giving Examples and Comparative Examples. In the following description, "part(s)" and "%" are by weight unless particularly noted.

Example 1

(Dispersion A)

The following ingredients were mixed and then stirred for 30 minutes, followed by dispersion by means of a Koboru mill (media: zirconium particles of 1 mm diameter; media packing: 60%). Coarse particles were removed using a centrifugal separator to obtain a dispersion A.

Carbon black (trade name: RAVEN 5250; available from Columbian Carbon Limited.)10 parts Styrene-acrylic acid copolymer sodium salt (trade name: JOHNCRYL 555; available from Johnson Polymer Co.; weight-average molecular weight: 5,000; acid value:

| | |
|---|---|
| 200) | 2 parts |
| Pure water | 88 parts |

(Black Ink 1)

The following ingredients including the above dispersion A were mixed and stirred, and thereafter coarse particles were removed again using a centrifugal separator to obtain a black ink 1 of the present example.

| | |
|---|---|
| Dispersion A | 50 parts |
| Potassium sulfate | 1 part |
| Diethylene glycol | 10 parts |
| Isopropyl alcohol | 3 parts |
| 2,4,7,9-tetramethyl-5-decyne-4,7-diol ethylene oxide addition product (trade name: SURFINOL 465; available from Nisshin Chemical Industry Works, Ltd.) | 0.05 part |
| Ultrapure water | 35.95 parts |

Comparative Example 1

(Black Ink 2)

A black ink 2 was prepared in the same manner as in Example 1 except that the potassium sulfate added in the black ink 1 was not added.

Evaluation

The black ink 1 of Example 1 and the black ink 1 of Comparative Example 1, obtained as described above, were tested in the following way to make evaluation. Results obtained are as shown in Table 1.

Using each of the black inks, images were formed by means of an ink-jet recording apparatus (trade name: BJC-4000; manufactured by CANON INC.) having an on-demand type multiple recording head capable of ejecting ink upon the application of heat energy to the ink in accordance with recording signals, and were evaluated according to the following methods and criteria.

1) Character Grade:

Using each of the black inks, characters were printed by means of the above ink-jet recording apparatus on the following five types of copying plain papers A, B, C, D and E used as recording mediums, and any blurs of characters in that printing were examined, making evaluation by the following criteria.

a: Blurs are barely seen.

b: Blurs are a little seen on some sheets of paper.

c: Blurs are seen.

As the copying plain papers A, B, C, D and E, the following were used. All the copying plain papers A, B, C, D and E shown hereinafter correspond to the following copying plain papers A, B, C, D and E.

A: PPC paper NSK, available from CANON INC.

B: PPC paper NDK, available from CANON INC.

C: PPC paper 4024, available from Xerox Corp.

D: PPC paper Plover Bond, available from Fox River Co.

E: PPC paper for CANON, available from Neusiedler K.K.

2) Print Density:

Using each of the black inks, characters were printed by means of the above ink-jet recording apparatus on five types of copying plain papers A, B, C, D and E used as recording mediums, and print densities in that printing were measured with a print density measuring instrument manufactured by Macbeth Co., making evaluation according to the following criteria.

a: Difference in print density between the highest and the lowest among the copying plain papers A, B, C, D and E is less than 0.05.

b: Difference in print density between the highest and the lowest among the copy plain papers A, B, C, D and E is 0.05 or more.

3) Rub Resistance:

Using each of the black inks, characters were printed by means of the above ink-jet recording apparatus on five types of copying plain papers A, B, C, D and E used as recording mediums. After the prints were left standing for a day, their rub resistance was tested under a weight load of 40 g/cm2, making evaluation according to the following criteria.

a: Stains are not conspicuous on any of the papers.

b: Stains are conspicuous on some papers.

c: Stains are conspicuous on all the papers.

TABLE 1

| | Evaluation Results | | |
|---|---|---|---|
| | Character grade | Print density | Rub resistance |
| Example: 1 | a | a | a |
| Comparative Example: 1 | a | c | b |

Example 2

(Ink Set 1)

The black ink 1 of Example 1 and color inks, a yellow ink 1, a magenta ink 1 and a cyan ink 1, prepared in the following way were put in combination to prepare an ink set 1 of the present Example.

(Yellow Ink 1)

The following ingredients were mixed and thoroughly stirred, followed by pressure filtration with Microfilter (available from Fuji Film K.K.) 3.0 μm in pore size to prepare the yellow ink 1.

| | |
|---|---|
| Acetylene glycol ethylene oxide addition product (trade name: ACETYLENOL EH; available froni Kawaken Fine Chemicals Co., Ltd.) | 1 part |
| Diethylene glycol | 10 parts |
| Glycerol | 5 parts |
| C.I. Direct Yellow 86 | 3 parts |
| Water | 81 parts |

(Magenta Ink 1)

The magenta ink 1 was prepared in the same manner as the yellow ink 1 except for using the following ingredients.

| | |
|---|---|
| Acetylene glycol ethylene oxide addition product (trade name: ACETYLENOL EH; available from Kawaken Fine Chemicals Co., Ltd.) | 1 part |
| Thiodiglycol | 20 parts |
| C.I. Acid Red 35 | 3 parts |
| Water | 76 parts |

(Cyan Ink 1)

The cyan ink 1 was prepared in the same manner as the yellow ink 1 except for using the following ingredients.

| | |
|---|---|
| Acetylene glycol ethylene oxide addition product (trade name: ACETYLENOL EH; available from Kawaken Fine Chemicals Co., Ltd.) | 1 part |
| Diethylene glycol | 35 parts |
| C.I. Acid Blue 9 | 3 parts |
| Water | 61 parts |

Comparative Example 2

(Ink Set 2)

The black ink 1 of Comparative Example 1 and color inks, namely, the yellow ink 1, magenta ink 1 and cyan ink 1 prepared as described above, were put in combination to prepare an ink set 2 of the present Comparative Example.

Evaluation

Using each of the ink sets of Example 2 and Comparative Example 2, recording on the five types of copying plain papers A, B, C, D and E was performed by means of an ink-jet recording apparatus (trade name: BJC-4000; manufactured by CANON INC.) having an on-demand type multiple recording head capable of ejecting ink upon the application of heat energy to the ink in accordance with recording signals. Then the results of this recording were evaluated according to the following method and criteria. Results obtained are as shown in Table 2.

Bleeding:

As printed images for making evaluation on the bleeding, a square area of 10 cm on each side on each of the plain papers was divided into squares, each being of 5 mm×5 mm, and solid black images and solid color images were alternately printed thereon using the black ink and the respective color inks. Then, any bleeding at the boundaries between the black-ink printed areas and the respective color-ink printed areas was examined, making evaluation according to the following criteria. Results obtained are as shown in Table 2.

a: Boundary lines between the two colors are sharp and neither blurs nor mixed colors are seen at the boundary regions.

b: Boundary lines between the two colors are clearly seen to be present, but blurs and mixed colors are a little seen at the boundary regions on some papers.

c: Boundary lines between the two colors are not distinguishable.

TABLE 2

| Evaluation Results on Bleeding | |
|---|---|
| Example 2: | a |
| Comparative Example 2: | c |

As is clear from the results shown in Table 2, no satisfactory results were obtained in respect of bleeding when the ink set of Comparative Example 2 was used. On the other hand, when the ink set of Example 2 was used, good color ink-jet recorded images free from bleeding were obtained on all types of recording mediums.

What is claimed is:

1. An ink comprising:

at least one salt selected from the group consisting of $(M_1)_2SO_4$, $CH_3COO(M_1)$, $Ph-COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;

a carbon black;

a dispersant for the carbon black; and an aqueous medium.

2. The ink according to claim 1, wherein said salt is contained in an amount of from 0.05% by weight to 10% by weight based on the total weight of the ink.

3. The ink according to claim 1, wherein said salt is contained in an amount of from 0.1% by weight to 5% by weight based on the total weight of the ink.

4. The ink according to any one of claims 1 to 3, wherein said dispersant is a sulfonic acid dispersant.

5. The ink according to any one of claims 1 to 3, wherein said dispersant is a carboxylic acid dispersant.

6. The ink according to claim 1, which is an ink used in ink-jet recording.

7. An ink set comprising a combination of a black ink with an aqueous color ink containing at least one of coloring materials selected from the group consisting of cyan, magenta, yellow, red, green and blue coloring materials; said black ink comprising the ink according to claim 1.

8. The ink set according to claim 7, wherein said coloring material is an acid dye or a direct dye.

9. The ink set according to claim 7, wherein said coloring material is a pigment.

10. An ink cartridge comprising an ink holder which holds therein the ink according to claim 1.

11. A recording unit comprising an ink holder which holds therein the ink according to claim 6 and a head assembly for ejecting the ink.

12. An image-recording apparatus comprising an ink cartridge comprising an ink holder which holds therein the ink according to claim 6, a recording head for ejecting the ink held in the ink cartridge, and a means for feeding the ink from the ink cartridge.

13. An image-recording apparatus comprising the recording unit according to claim 11.

14. A color-image-recording apparatus comprising the recording unit according to claim 11, and a recording unit having an ink holder which holds therein an aqueous color ink containing at least one of coloring materials selected from the group consisting of cyan, magenta, yellow, red, green and blue coloring materials, and a recording head for ejecting the color ink held in the ink holder.

15. A color-image-recording apparatus comprising an ink cartridge comprising an ink holder which holds therein the ink according to claim 6, an ink cartridge having an ink holder which holds therein an aqueous color ink containing at least one of coloring materials selected from the group consisting of cyan, magenta, yellow, red, green and blue coloring materials, a recording head for ejecting the respective inks held in the respective ink holders, and means for feeding the respective inks from the respective ink cartridges to the recording head.

16. An ink-jet recording process comprising the steps of ejecting the ink according to claim 6, and adhering the ink to the surface of a recording medium.

17. The ink-jet recording process according to claim 16, wherein energy for ejecting the ink is heat energy.

18. The ink-jet recording process according to claim 16, wherein energy for ejecting the ink is mechanical energy.

19. An aqueous ink for ink-jet recording, comprising a carbon black, a dispersant for the carbon black, and an aqueous medium, and further comprising as a bleeding relieving agent at least one salt selected from the group consisting of $(M_1)_2SO_4$, $CH_3COO(M_1)$, $Ph—COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group; wherein the ink comprising carbon black reduces bleeding between itself and an aqueous color ink at their boundary area when the ink comprising carbon black and the color ink are so applied to a recording medium as to be adjacent to each other, and wherein an ink not containing the salt but otherwise identical to the ink comprising carbon black causes bleeding when applied to plain paper by ink-jet recording adjacent to an aqueous different-color ink, at their boundary region.

20. A process for reducing bleeding of an aqueous black ink and an aqueous color ink at their boundary region when the black ink and the color ink are applied to a recording medium so as to be adjacent to each other; said black ink being an ink comprising:
- at least one salt selected from the group consisting of $(M_1)_2SO_4$, $CH_3COO(M_1)$, $Ph—COO(M_1)$, $(M_1)NO_3$, $(M_1)Cl$, $(M_1)Br$, $(M_1)I$, $(M_1)_2SO_3$ and $(M_1)_2CO_3$ wherein $M_1$ represents an alkali metal, ammonium or an organic ammonium, and Ph represents a phenyl group;
- a carbon black; and
- a dispersant for the carbon black;

which are contained in an aqueous medium.

* * * * *

UNITED STATES PATENT AND TRADEMARK OFFICE
CERTIFICATE OF CORRECTION

PATENT NO. : 6,533,853 B1
DATED : March 18, 2003
INVENTOR(S) : Shinya Mishina et al.

It is certified that error appears in the above-identified patent and that said Letters Patent is hereby corrected as shown below:

Column 5,
Line 28, "exhits" should read -- exhibits --.

Column 6,
Line 14, "thereof;" should read -- thereof, --.

Column 10,
Line 36, HfB$_2$." should read -- HfB$_2$, --.

Column 12,
Line 63, "92 and" should read -- 93 and --.

Column 15,
Line 28, "froni" should read -- from --.

Signed and Sealed this

Twenty-eighth Day of October, 2003

JAMES E. ROGAN
*Director of the United States Patent and Trademark Office*